United States Patent
Reichenberger et al.

[11] Patent Number: 5,968,614
[45] Date of Patent: Oct. 19, 1999

[54] B-PILLAR COVERS FOR AUTOMOTIVE VEHICLE

[75] Inventors: Fritz Reichenberger, Aurora; Lassi M. Ojanen, Richmond Hill, both of Canada

[73] Assignee: Decoma International Inc., Concord, Canada

[21] Appl. No.: 08/985,040

[22] Filed: Dec. 4, 1997

Related U.S. Application Data

[60] Continuation-in-part of application No. 08/724,670, Oct. 1, 1996, abandoned, which is a division of application No. 08/503,863, Jul. 18, 1995, abandoned.

[51] Int. Cl.⁶ ..................................................... B32B 3/06
[52] U.S. Cl. .......................... 428/31; 428/40.1; 428/42.2; 296/1.1
[58] Field of Search ................. 428/31, 40.1, 42.2; 296/1.1; 280/801.1

[56] References Cited

U.S. PATENT DOCUMENTS

| | | | |
|---|---|---|---|
| 3,277,224 | 10/1966 | Whiteford | 264/160 |
| 3,378,888 | 4/1968 | Robertson | 18/35 |
| 3,642,416 | 2/1972 | Miller | 425/438 |
| 3,737,498 | 6/1973 | Jackson | 264/92 |
| 3,898,315 | 8/1975 | Haag | 264/312 |
| 3,986,809 | 10/1976 | Haag | 425/388 |
| 4,030,871 | 6/1977 | Cobb | 425/388 |
| 4,666,394 | 5/1987 | Wakamiya | 425/342.1 |
| 4,736,981 | 4/1988 | Barton et al. | 296/201 |
| 4,904,508 | 2/1990 | Madonia | 428/42.1 |

FOREIGN PATENT DOCUMENTS

| | | |
|---|---|---|
| 2 639 309 | 5/1990 | France . |
| 2 210 625 | 6/1989 | United Kingdom . |

*Primary Examiner*—Alexander Thomas
*Attorney, Agent, or Firm*—Pillsbury, Madison & Sutro LLP

[57] ABSTRACT

Thin walled B-pillar covers for an automotive vehicle comprise a thin sheet of thermoplastic material of generally uniform thickness vacuum molded about a continuous body molding surface of a molding horn to provide a main body portion having a U-shaped marginal edge along one elongated peripheral extent thereof of a shape to snugly receive therein the sheet metal marginal edge of a vehicle part and an inturned flange along an opposed elongated peripheral extent thereof of a shape to be presented to the inturned surface of the vehicle part. By vacuum molding the thin theremoplastic material about a body molding surface of a molding horn, a cover having a substantially dimple-free, smooth class A exterir surface.

5 Claims, 9 Drawing Sheets

B-PILLAR COVERS FOR AUTOMOTIVE VEHICLE

This application is a continuation-in-part of Ser. No. 08/724,670, filed Oct. 1, 1996 abandoned, which is a divisional application of Ser. No. 08/503,863, filed Jul. 18, 1995, abandoned.

This application relates to vehicle parts and more particularly to improvements in plastic door pillar covers and the method of making such covers.

It is well known that many vehicles mask the portion of the door B-pillar which is coextensive with the window so as to provide edge coverage as well as color contrast. Heretofore, covers of this type have been injection molded of a suitable plastic material. In order to achieve a high gloss finish, the molded article is either injection molded over a preformed paint film laminate inserted in the mold or painted in conventional fashion after molding with the required number of coats. This method of making the covers resulted in the formation of wall thickness greater than required because of the necessity to practice efficient mold filling procedures. The cost of providing excess material and the added cost of finishing the part created a particular need for cost effectiveness in producing the part.

Moreover, B-pillar covers are installed in a highly visible position on the vehicle. Every time a driver or passenger enters a vehicle, the driver or passenger will glance at the B-pillar. Thus, any defect on the exterior surface of the B-pillar will be noticed and will dramatically affect consumer acceptance and satisfaction. Thus, it is critical that the B-pillar cover have a very smooth exterior surface. This surface, in the automotive industry, is known as a "class A" finish. The standards for a class A finish are well known in the industry, and, in particular, are known to be very stringent. Parts having even minor cosmetic defects in the class A finish will be rejected.

While vacuum molding thin plastic parts has heretofore been performed, the present inventors have discovered that such methods suffer from inherent drawbacks in applications requiring a class A finish. Vacuum molding processes have involved creating a vacuum at a body molding surface so as to draw a thermoplastic material to the body molding surface. Vacuum orifices are formed in the body molding surface and are connected, via vacuum channels, to a vacuum source. Where the part to be molded is to be formed from relatively thin material, such as a B-pillar, drawing the surface to the body molding surface can create small vacuum dimples at the vacuum orifices. Such dimples would be visible to the eye, especially when the sun is shinning on the part, and, therefore, are unacceptable for a class A finish.

An object of the present invention, therefore, is to satisfy the need identified above. In accordance with the principles of the present invention, this objective is achieved by providing a method of making thin walled covers with the use of a vacuum mold assembly. Each of the thin walled covers is shaped to fit over a vehicle part having an exterior surface configuration defined along an elongated peripheral extent thereof by a thin sheet metal marginal edge and along an opposed elongated peripheral extent thereof by an in turned surface. The vacuum mold assembly includes a plurality of molding horns, each having a surface configuration molding surface corresponding in shape substantially to the shape of a vehicle part surface configuration, a thin marginal edge molding surface corresponding in shape substantially to the shape of a vehicle part thin sheet metal marginal edge and an in turned surface molding surface corresponding in shape substantially to the shape of a vehicle part inturned surface. The plurality of molding horns are movably mounted in the vacuum mold assembly. The method comprises the steps of providing a thin sheet of thermoplastic material of generally uniform thickness and placing the thin sheet of thermoplastic material in a heated condition in operative relation with the plurality of molding horns of the vacuum mold assembly so that spaced main body portions of the sheet are disposed in spaced coextensive relation with the surface configuration molding surfaces of the molding horns and adjacent portions of the heated sheet extend beyond the thin marginal edge molding surfaces and the inturned surface molding surfaces of the molding horns. A relative movement between the sheet and the vacuum mold assembly is effected and thereafter a vacuum is applied to the vacuum mold assembly sufficient to form a peripheral seal with a surface area of the sheet which includes the surface configuration providing and adjacent portions thereof and to cause the main body portions of the heated thin sheet of thermoplastic material to move into engagement with the surface configuration molding surfaces of said molding horns in a direction generally perpendicular thereto and the adjacent portions of the heated thin sheet of thermoplastic material to move into engagement around the thin marginal edge molding surfaces of the molding horns and into engagement with the inturned surface molding surfaces of the molding horns so as to form within the peripheral seal of the thin sheet of thermoplastic material a plurality of thin walled covers each comprising a main body portion having a U-shaped marginal edge along one elongated peripheral extent thereof of a shape to snugly receive therein the sheet metal marginal edge of a vehicle part and an inturned flange along an opposed elongated peripheral extent thereof of a shape to be adhered to the inturned surface of the vehicle part. Thereafter, the thin sheet of thermoplastic material with the thin walled covers therein in a cooled condition is separated from the vacuum mold assembly during which the molding horns move so that the surface configuration providing portions of the thin sheet of thermoplastic material engaged with the surface configuration molding surfaces of the molding horns move relatively away from the latter in an angular direction having a component in a direction to withdraw the thin marginal edge molding surfaces of said molding horns relatively out of the U-shaped marginal edges of the formed thin walled covers. Finally, the formed thin walled covers are cut from the sheet after being separated from the vacuum mold assembly.

Another object of the present invention is to provide a more cost effective cover of the type described. In accordance with the principles of the present invention, this objective is achieved by providing a cover for a vehicle pillar part which has an exterior surface configuration defined along an elongated peripheral extent thereof by a thin sheet metal marginal edge and along an opposed elongated peripheral extent thereof by an inturned surface. The cover comprises a thin sheet of thermoplastic material of generally uniform thickness vacuum molded about a continuous body molding surface of a molding horn to provide a main body portion defined along a first elongated peripheral extent thereof by a first vacuum formed transverse bend in the thin sheet of thermoplastic material having a first integral vacuum formed strip extending transversely therefrom in generally parallel coextensive relation to a margin of the main body portion extending along the first peripheral extent thereof. The first transverse bend and strip defines with the margin a marginal edge of U-shaped cross-sectional configuration. The main body portion is defined along a second generally opposed elongated peripheral extent by a second vacuum formed transverse bend in the thin sheet of thermoplastic material which has a second integral vacuum formed strip extending therefrom to form an inturned flange. The first and second bends extend in the same general transverse direction with respect to the main body portion. The thin sheet of thermoplastic material is vacuum molded about the continuous body molding surface of the molding horn to have an interior surface shaped (1) along the U-shaped marginal edge thereof to snugly receive therein the sheet metal marginal edge of the vehicle part (2) along the main body portion thereof to be presented to the exterior surface configuration of the vehicle pillar part and (3) along the inturned flange thereof to be presented to the inturned surface of the vehicle pillar part.

These and other objects of the present invention will become more apparent during the course of the following detailed description and appended claims.

The invention may best be understood with reference to the accompanying drawings wherein an illustrative embodiment is shown.

IN THE DRAWINGS

Figure 1:
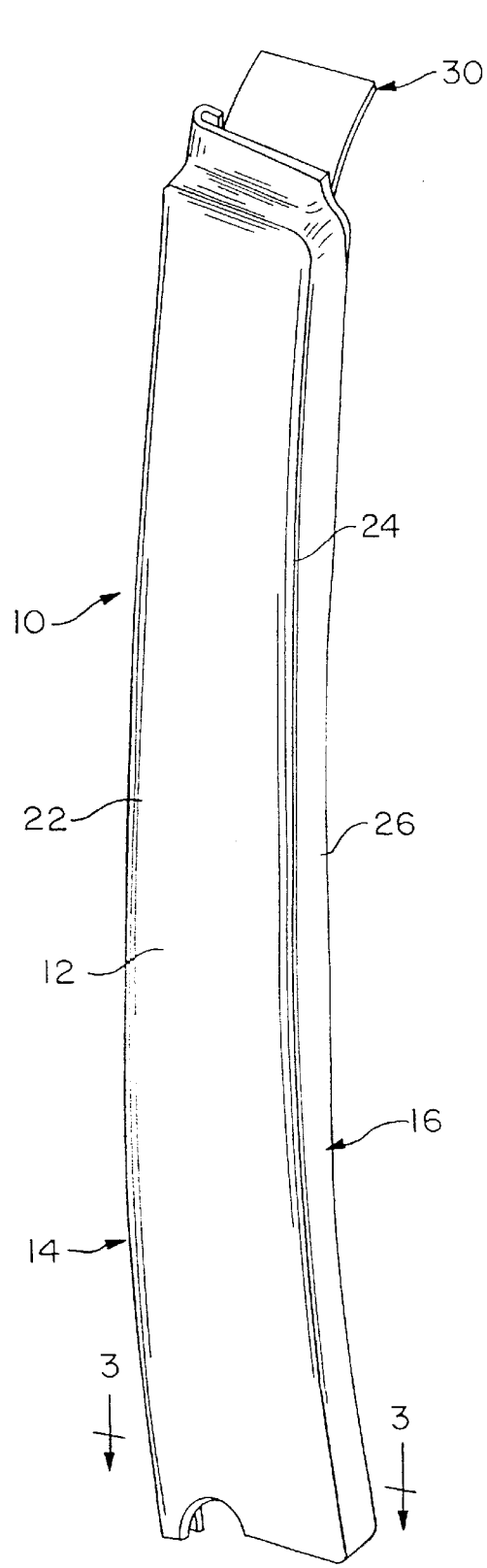
FIG. 1 is a perspective view looking downwardly and to the front of the exterior side of a cover for a right-front door B-pillar constructed in accordance with the principles of the present invention.
Figure 2:
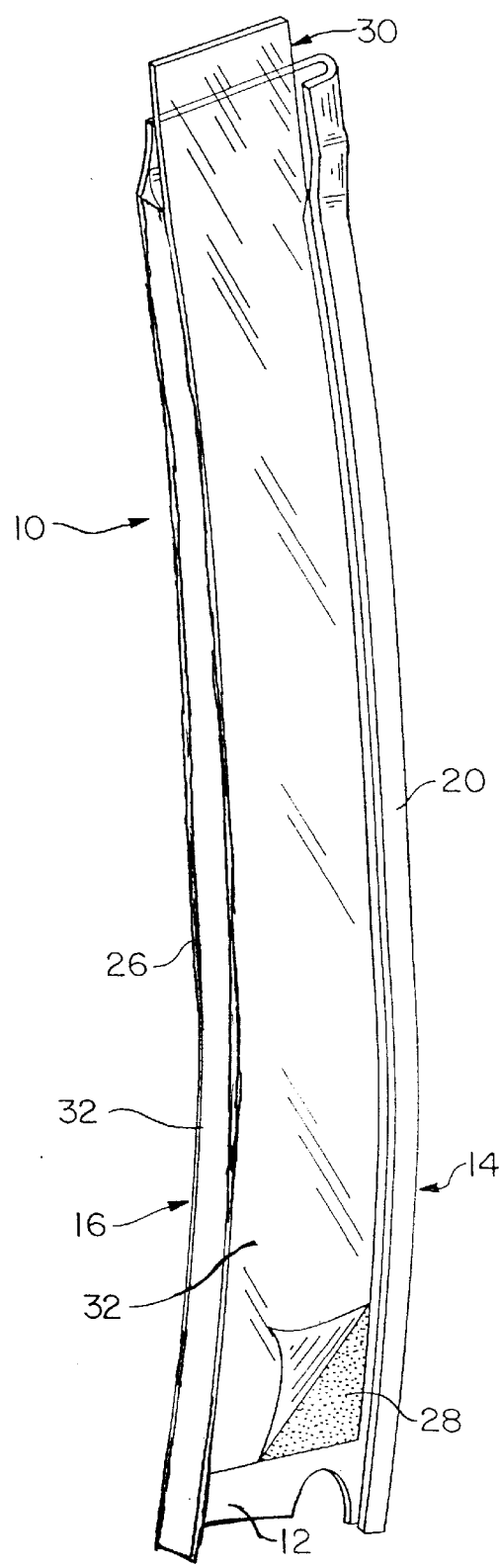
FIG. 2 is a perspective view of the cover shown in FIG. 1 looking down and to the rear of the interior side thereof.
Figure 3:
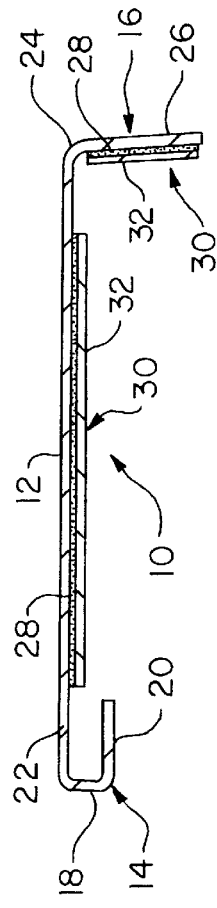
FIG. 3 is an enlarged fragmentary sectional view taken along the line 3—3 of FIG. 1.

Referring now more particularly to the drawings, there is shown in FIGS. 1–3 thereof a vehicle part cover, generally indicated at 10, which embodies the principles of the present invention. The cover 10 is made of a thin sheet of thermoplastic material of uniform thickness by a vacuum forming process. Preferably, the process includes steps in accordance with the principles of the present invention.

As best shown in FIGS. 1–3, the cover 10 includes a main body portion 12 having an elongated marginal edge portion, generally indicated at 14, along one elongated peripheral extent thereof which is of generally U-shaped cross-sectional configuration and a flange, generally indicated at 16, extending along an opposed elongated peripheral extent thereof. The U-shaped marginal edge portion 14 includes a short rather sharp transverse bend 18 which extends from the peripheral extent of the main body portion 12, the transverse bend 18 having an integral strip 20 extending therefrom which is disposed in generally parallel relation with an edge margin 22 of the main body portion. The flange 16 includes a transverse bend 24 which extends from the main body portion 12 in the same general direction as the bend 18 and a strip 26 which extends from the bend 24.

The cover 10, as best shown in FIG. 1, is shaped to be applied to the portion of the B-pillar of a right hand vehicle door which is generally coextensive with the window area. The U-shaped marginal edge portion 14 is shaped to receive therein the sheet metal marginal edge of the portion of the rear extremity of the door which is coextensive with the window area. The main body portion 12 of the cover 10 is shaped to be adhered to the exterior surface configuration of the portion of the B-pillar of the vehicle door which is coextensive with the window. The flange 14 of the cover 10 is shaped to be adhered to the inturned surface of the portion of the B-pillar of the vehicle door which is coextensive with the window. When actually mounted on the vehicle, the flange 14 of the cover 10 will have a trim strip secured to the exterior thereof and there will be trim strips along the upper edge and lower edge of the main body portion 12. In this regard, it will be noted that the upper edge includes an indented portion which is adapted to receive the upper trim strip.

As best shown in FIG. 2, each cover 10, prior to its application to a vehicle part, has an adhesive layer 28 adhered to the interior surface of the interior surface of the body portion 12 thereof and to the interior surface of the flange 16 thereof. Each adhesive layer 28 forms a part of a composite tape, generally indicated at 30. Each composite tape 30 is of known constructions and includes a non-adhesive release layer 32 adhered to the opposite surface of the adhesive layer 28. It will be understood that, just prior to the application of the cover to the vehicle part, the release layers 32 of the composite tapes 30 are removed leaving the opposite surfaces of the adhesive layers exposed. The cover 10 is applied by moving the marginal edge portion 14 of the cover 10 over the sheet metal marginal edge of the door so that the latter is snugly received with the U-shaped marginal edge portion 14. The main body portion 12 and flange 14 are then applied to the main surface configuration and inturned surface respectively of the vehicle part so that adhesive layers 28 retain the cover 10 in operatively engaged covering relation to the vehicle part.

Figure 4:
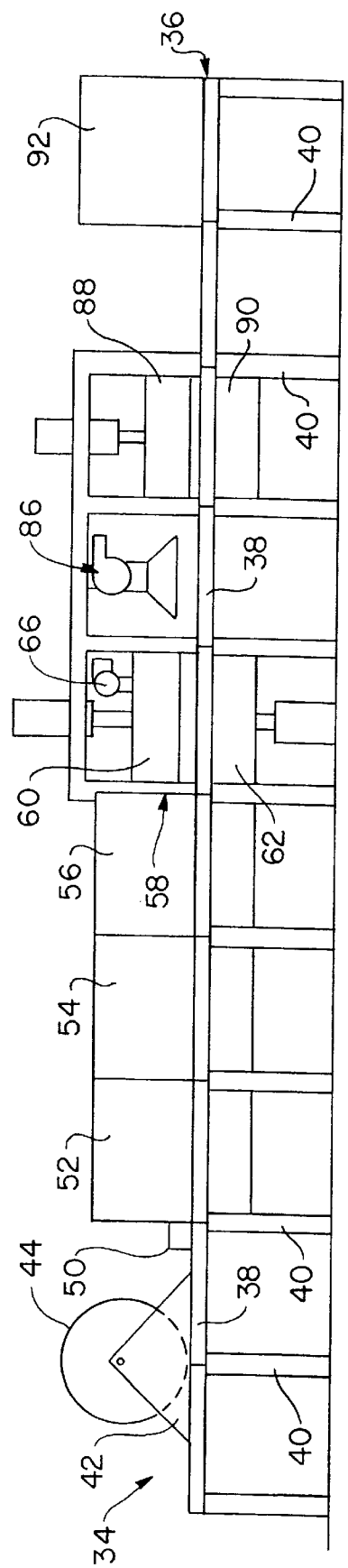
FIG. 4 is a somewhat schematic side elevational view of an apparatus for practicing the method of making the cover in accordance with the principles of the present invention.

FIG. 4 illustrates somewhat schematically an apparatus, generally indicated at 34, which can be used in performing the preferred method of the subject matter. As shown, the apparatus 34 includes a main frame assembly, generally indicated at 36, which includes a pair of transversely spaced main horizontal frame members 38 supported by a series of longitudinally spaced legs 40. As shown in FIG. 4, one end of the main frame assembly 36 has mounted thereon supports 42 for rotatably supporting a continuous roll 44 of thermoplastic material having a generally uniform width and generally uniform thickness. A predetermined length of the continuous roll 44 constitutes a sheet of thermoplastic material which is processed in accordance with the principles of the present method. As shown, there are provided in the main frame members 38 suitable power operated conveying mechanisms, generally indicated at 46. The conveying mechanisms 46 are schematically illustrated in FIGS. 5–9 as including a series of pinlike rotors 48 which are capable of engaging openings punctured in opposite marginal edges of the continuous sheet by puncturing mechanism 50 located forwardly of the supports 42. The subsequently spaced rotors 48 serve to advance the continuous sheet 44 intermittently forward a distance equal to the aforesaid predetermined length. The dwell time between movements is, for example, 25 seconds. The forward advance of the continuous roll 44 so moves successive predetermined lengths thereof are moved intermittently through a multiplicity of stations provided on the main frame assembly 36. It will be understood that other types of conveying mechanisms may be used such as endless chains with pins and the like.

The first three stations in which the predetermined lengths of the roll 44 are advanced consist of three ovens or oven chambers 52, 54 and 56 which are capable of being maintained at different temperatures. The temperatures which are utilized in the ovens will be dependent upon the particular thermoplastic material which is utilized in the continuous roll 44.

The continuous roll 44 is preferably formed as a thin coated substrate of thermoplastic material of uniform thickness, as, for example, 2 mm. Exemplary thermoplastic materials for the substrate are polycarbonates or acrylonitrile butadiene styrene (ABS) or polyvinyl chloride (PVC) or blends thereof. The coating is preferably paint material of the dry paint film laminate type. Examples of such coatings include a acrylic polyvinylidene difluoride (PVDF) clear coat of 1 to 2 mils, a PVDF acrylic base color coat of 0.6 to 1.2 mils, and a thermoplastic adhesion promoter size coat of 0.1 mils. The particular formulation of the coating is dependent upon the color and the surface gloss which is desired for the finished cover 10 and the coating will, of course, be on the exterior surface of the finished cover so as to provide the desired color and gloss when applied to the vehicle part. While the use of a color and gloss providing coating is greatly preferred, the broadest aspects of the present invention contemplates the use of a substrate alone and conventional painting after vacuum forming. Examples of the oven temperatures when utilizing an ABS substrate suitably coated with dry paint material is for the first stage 52 approximately 450° F., the second stage 54 approximately 480° F., and the third and final stage 56 approximately 520° F. These temperatures are related to the exemplary intermittent speed of operation of 25 seconds.

With the materials, temperatures and times noted above, the sheet of thermoplastic material will be moved out of the third oven stage at a temperature of about 340° F. Each successive predetermined length is moved from the third oven stage 56 into a forming station which includes a vacuum mold assembly, generally indicated at 58. The vacuum mold assembly 58 includes a pair of upper and lower mold parts 60 and 62 which are suitably mounted in the main frame assembly 36 for relative movement in a direction toward and away from each other between opened and closed positions.

As best shown in FIGS. 5–9, the upper mold part 60 is of generally hollow configuration and includes an upper peripheral seal element 64 in the lower peripheral edge thereof. As shown in FIG. 4, the hollow upper mold part 60 carries a blower assembly 66 which, for example, may have the capability of moving 2,000 cubic feet per minute of ambient air through the hollow upper mold part 60. The blower assembly 66 is positioned to blow ambient air into the mold part 60 down on the upper surface of the sheet 44 after the vacuum molding procedure has been completed and the upper seal 64 has moved away from the periphery of the sheet 44.

The lower mold part 62 is likewise in the form of a hollow member. However, the mold part 62 has mounted thereon a frame structure 68 for applying a source of vacuum to the area of the sheet 44 engaged by the upper seal 64 and a corresponding lower seal element 70. Seal element 70 faces upwardly and is in generally coextensive relation with the peripheral seal 64 of the upper mold part 60.

Mounted on the frame structure 68 of the lower mold part 62 is a plurality of molding horns 72. In the embodiment shown, there are eight molding horns 72 provided so that, during each vacuum molding operation, eight covers 10 can be formed in the sheet 44. It will be understood that, in a four door sedan, there will most likely be four different covers required in that the portions of the B-pillars which are coextensive with the windows in the two front doors will be most likely mirror images of one another and the portions of the B-pillars of the rear doors which are coextensive with the windows will be mirror images of one another but also will vary with respect to the other two covers because of the orientation of the U-shaped edges and flanges of the body portions. With the use of eight molding horns 72, each sheet 44 can be molded to provide two sets of four covers for a four door car.

It will be noted that each of the molding horns 72 have in common the provision of a main body which presents a main body forming surface 74 conforming in shape substantially to the surface configuration of the vehicle part over which the cover 10 is to be mounted. Moreover, each molding horn 72 also has formed along one elongated peripheral extent thereof a marginal edge forming surface 76 which conforms substantially in shape to the sheet metal marginal edge of the vehicle part. Similarly, each molding horn 72 also includes a flange forming surface 78 which is shaped substantially the same as the inturned surface of the vehicle part.

Where two or more molding horns 72 are provided in the vacuum mold assembly 58, the procedure for applying the heated sheet 44 to the molding horns 72 and removing the formed sheet after the vacuum has been applied presents a problem due to the configuration of the cover and the need to provide an exterior surface which is free of freeze marks. Freeze marks can be prevented by applying the heated sheet 44 to the major body forming surface 74 in a general perpendicular direction. It is noted that the surfaces 74 are somewhat bowed in the elongated direction but the bowing is not sufficient to cause a problem in the application of the sheet to the surfaces from a freeze mark point of view. Freeze marks may well occur as the sheet is applied around the elongated edge forming surfaces 76 or the flange forming surfaces 78. However, freeze marks on these areas of the cover do not seriously hamper the appearance because these areas are more or less hidden by trim strips or other door edges or pillar edges in operation.

It can be seen that, where there are two molding horns which require a certain initial orientation of the sheet 44 and a predetermined relative movement between the sheet 44 and molding horns 72 to apply the sheet to the surfaces 74, there will be a difficult problem in removing the formed sheet 44 after the vacuum forming as been accomplished because of the edge forming surfaces 76 which are within U-shaped sections of the sheet after formation. In order to accommodate these considerations, the molding horns 72 are movably mounted on the frame structure 68. As shown, each molding horn 72 has a pair of depending legs 80 spaced along the longitudinal extent thereof and the legs 80 are mounted in the frame structure 68 by pivot pins 82 (see FIG. 9) which serve to mount the molding horns 72 for pivotal movement about the aligned axis of the pins 82. The aligned axes of the plurality of horns 72 are preferably oriented so as to be generally parallel with one another.

Figure 11:
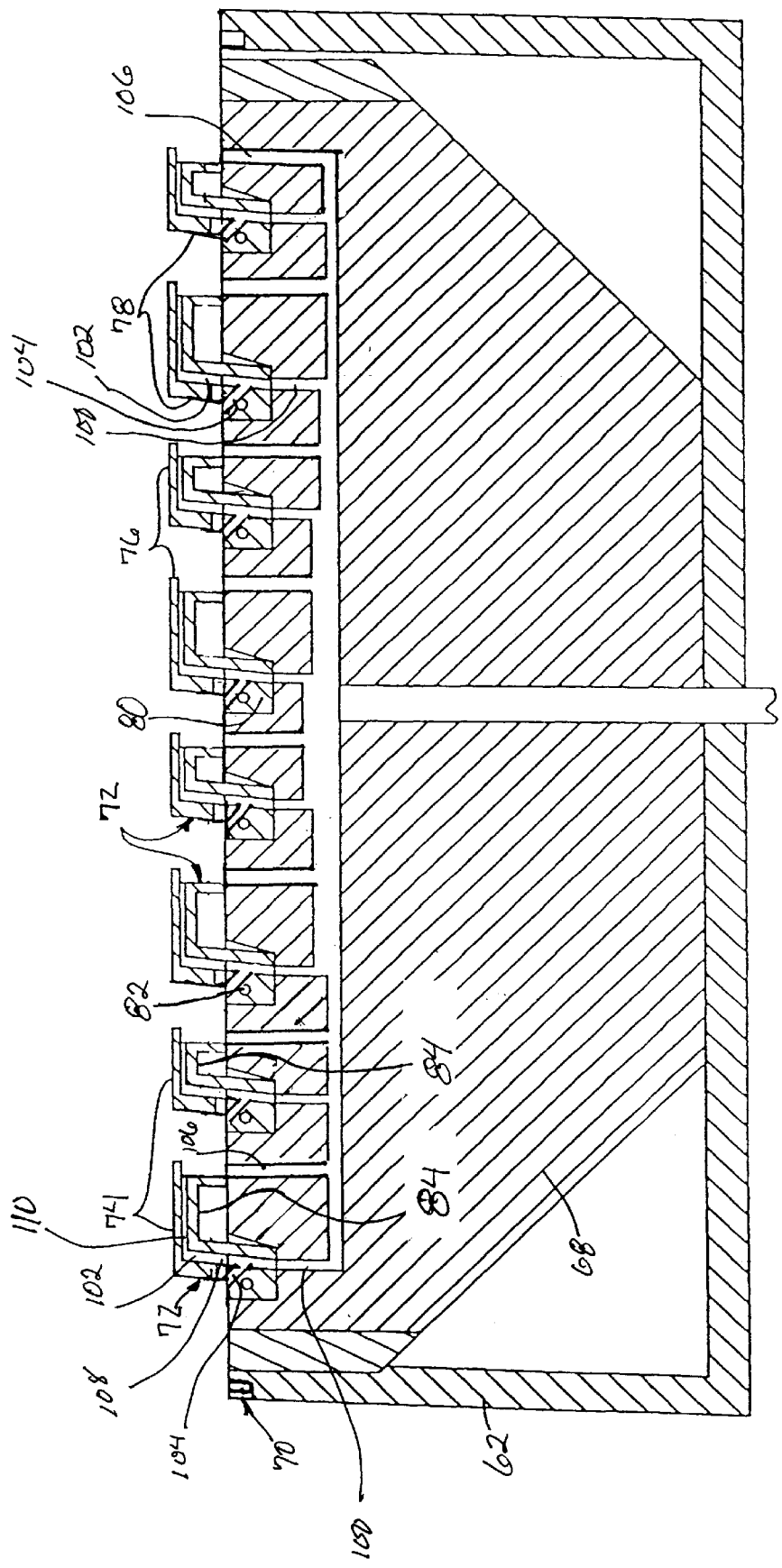
FIG. 11 is an enlarged sectional view showing the lower parts of a vacuum molding assembly.

As best shown in FIG. 11, a plurality of vacuum channels are provided in the frame structure 68, some of which communicate with interior channels formed in the molding horns 72. More specifically, the frame structure defines a manifold from which extend a plurality of channels 100 which communicate with interior channels 102 formed interiorly of the molding horns 72. Each interior channel 102 includes a first portion 108 entering into the horn 72 through one or both depending legs 80 and extending up along the flange forming surface 78. A second portion 110 extends transversely from the first portion 108 along the main body forming surface 74 and exits the molding horn 72 below the marginal edge forming surface 76. optionally, a branch channel 104 may be provided which extends off the first portion 108 and exits the molding horn 72 at the base of the flange forming surface 78. A second set of channels 106 may be provided within frame structure 68 which exits the frame structure 68 proximate the base of each molding horn 72 below the marginal edge forming surface. As can be appreciated, no vacuum channels exit the main body forming surface 74 of the molding horn 72 so no vacuum orifices are defined in the main body forming surface 74.

Each molding horn 72 is also provided with an electric heater element 84 which, in operation, is controlled to maintain the molding horns 72 at a generally constant temperature within the range of 220°–230° F.

Figure 5:
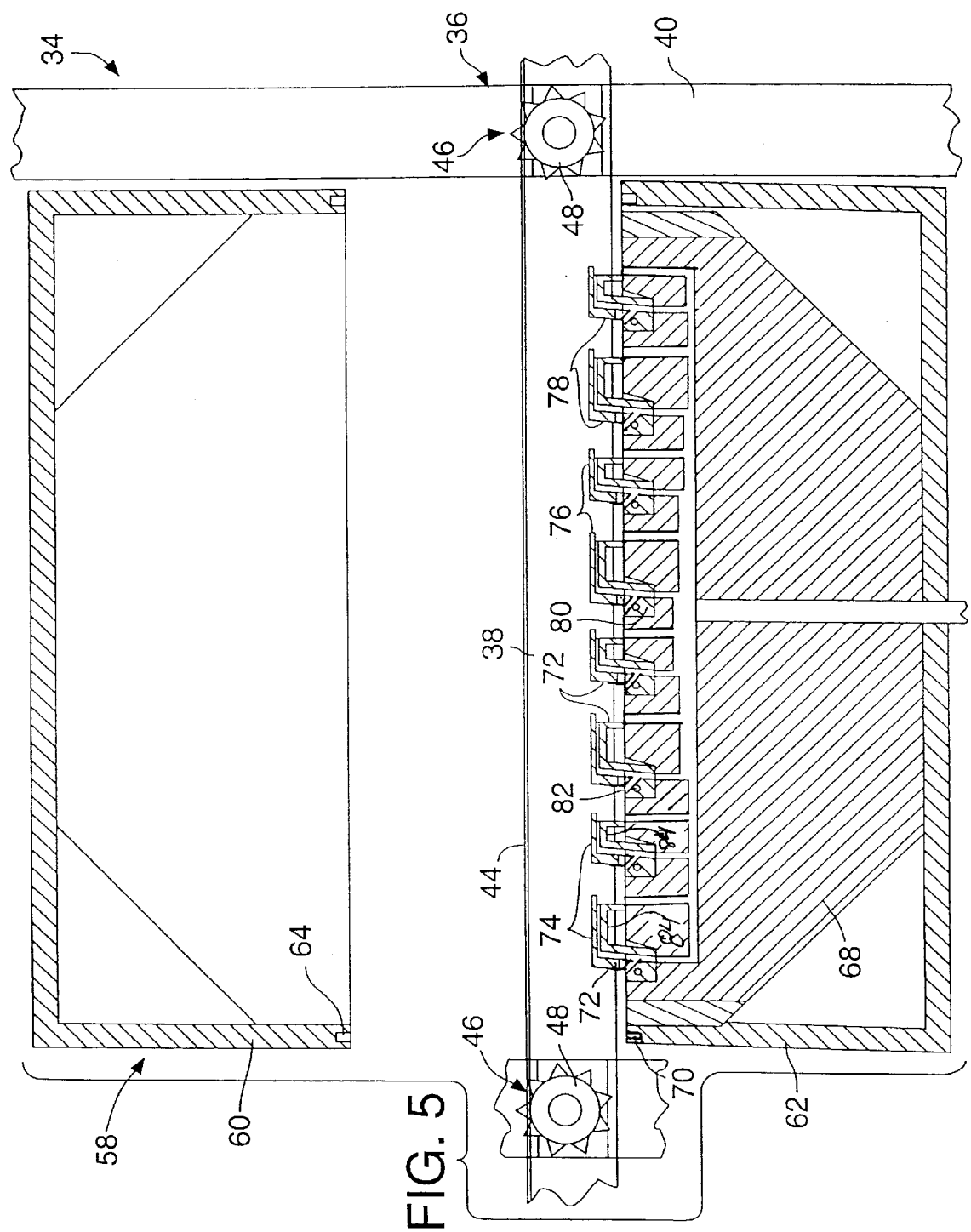
FIG. 5 is a fragmentary sectional view taken along the direction of movement of the sheet through a molding horn pivot showing the initial position of the upper and lower parts of the vacuum mold assembly after a heated sheet has been positioned therebetween.
Figure 6:
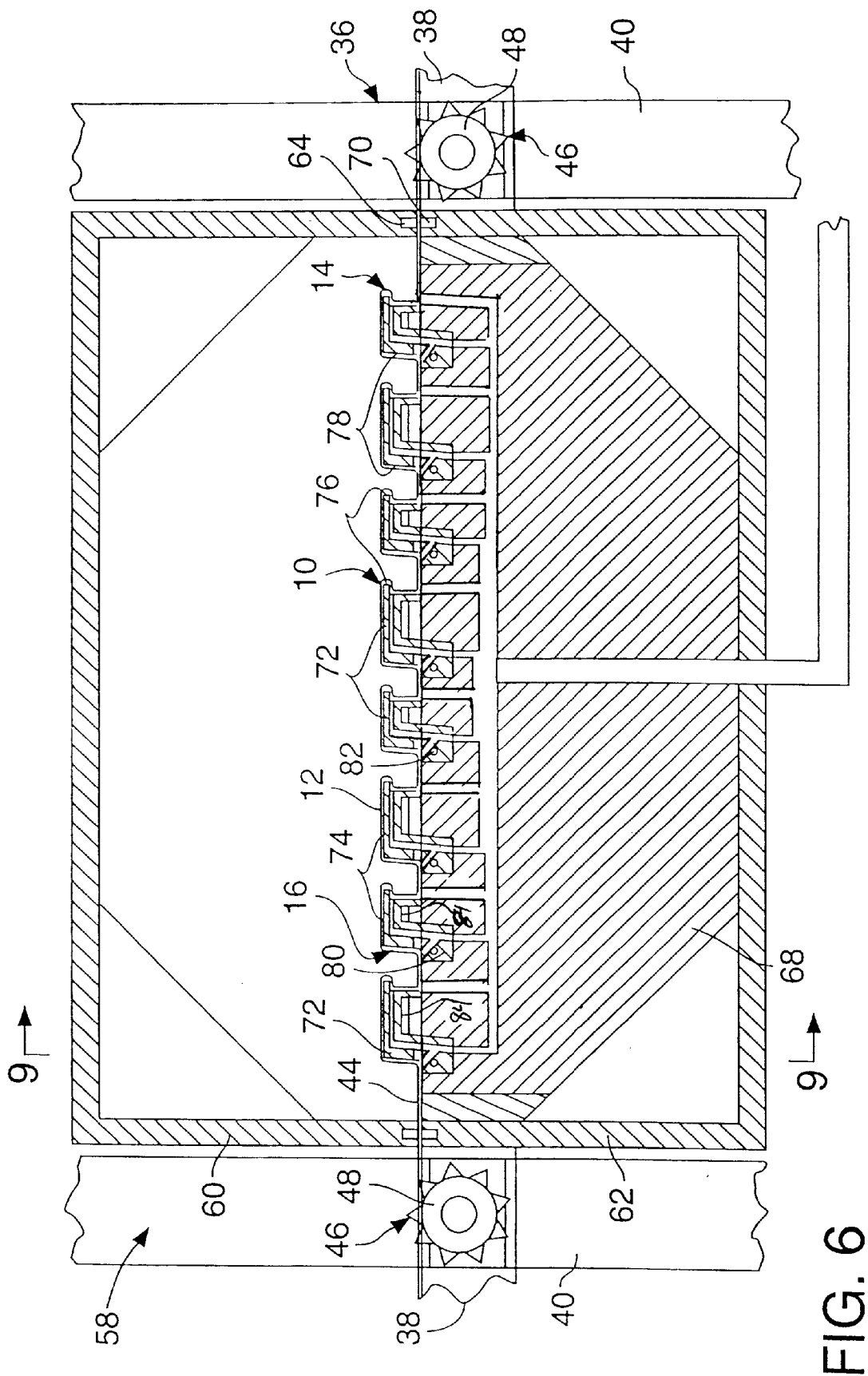
FIG. 6 is a view similar to FIG. 5 showing the position of the parts during the vacuum forming procedure.
Figure 7:
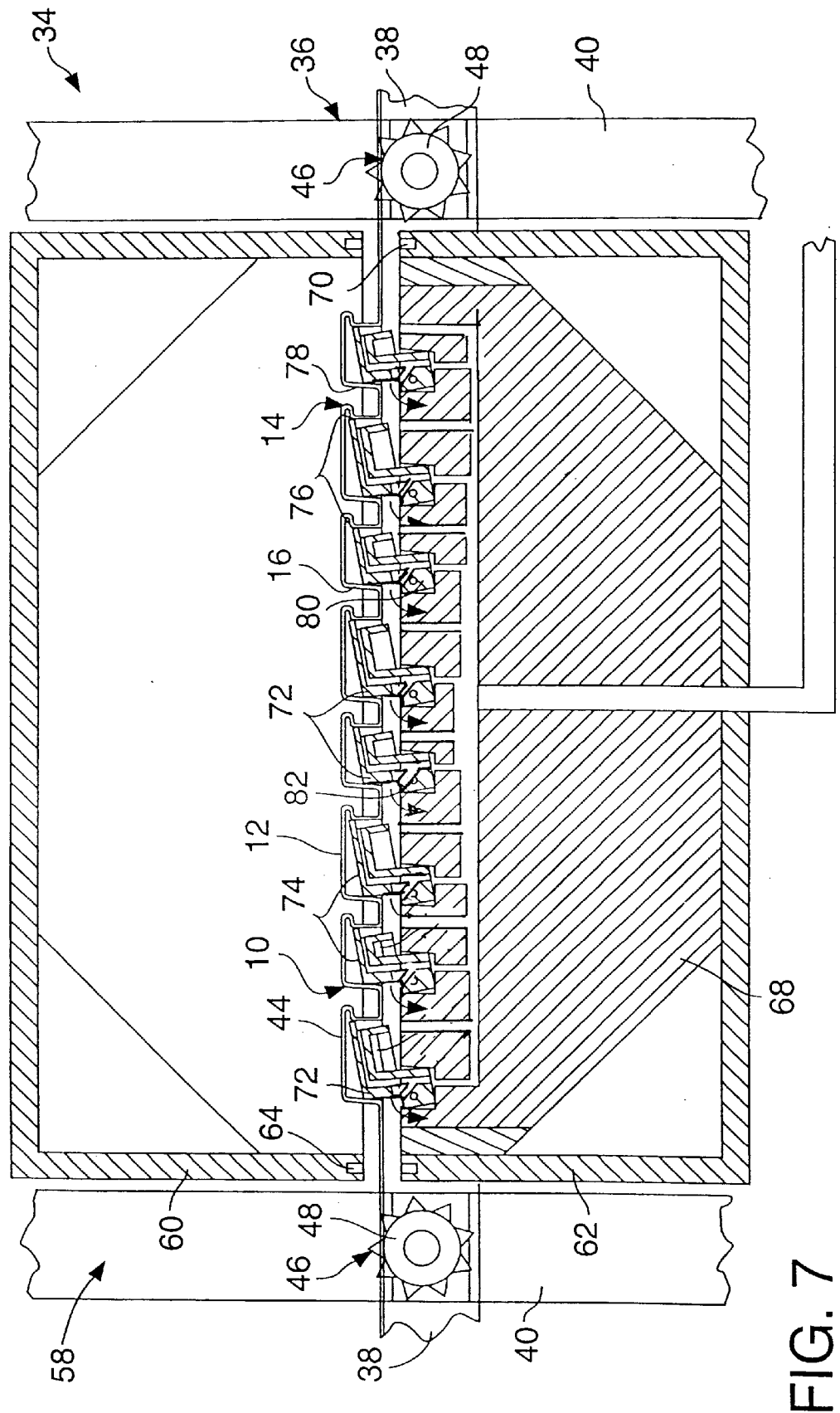
FIG. 7 is a view similar to FIG. 6, showing the position of the parts as the molded sheet begins to be separated therefrom.
Figure 8:
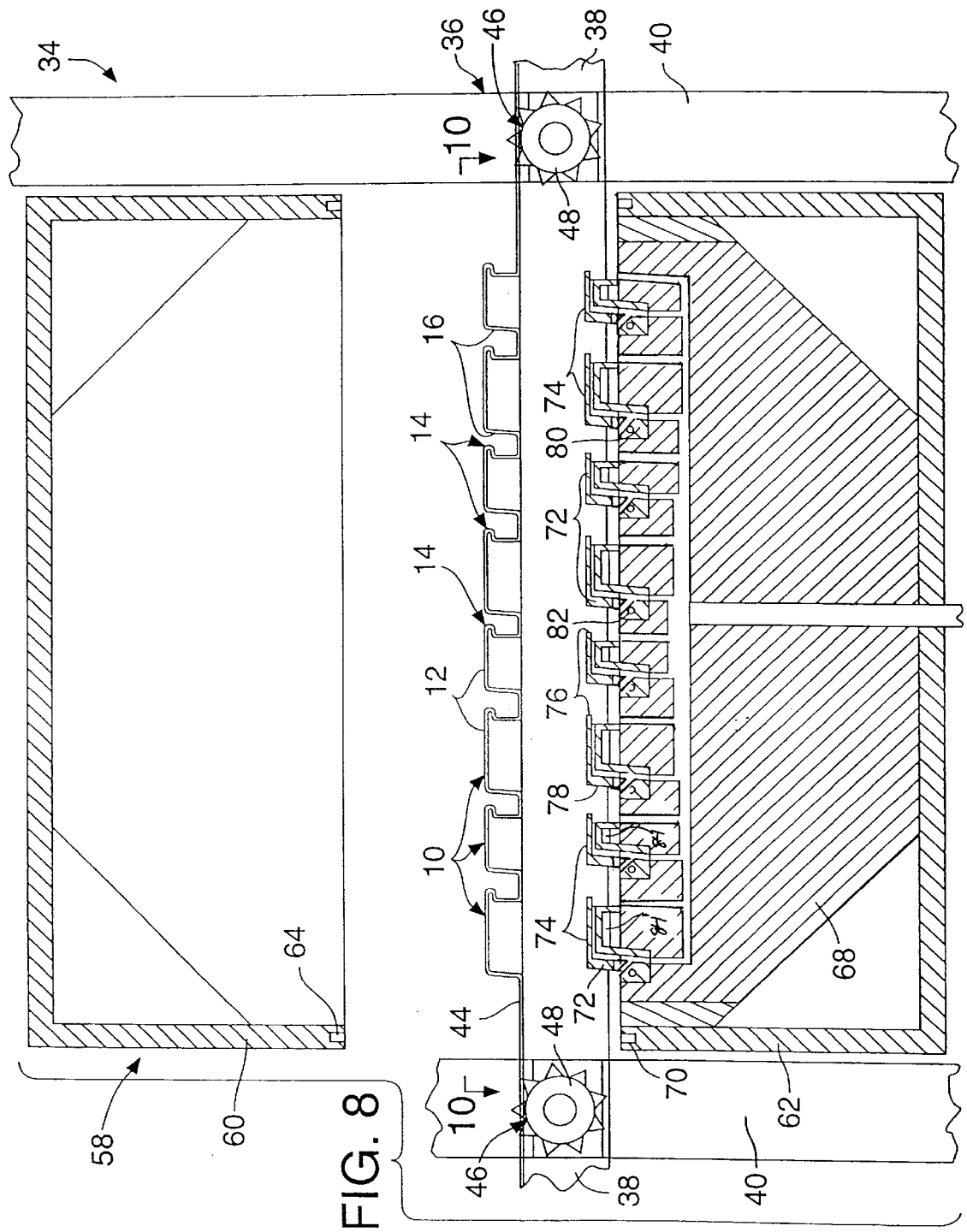
FIG. 8 is a view similar to FIG. 7 showing the position of the parts after separation of the mold sheet therefrom.
Figure 9:
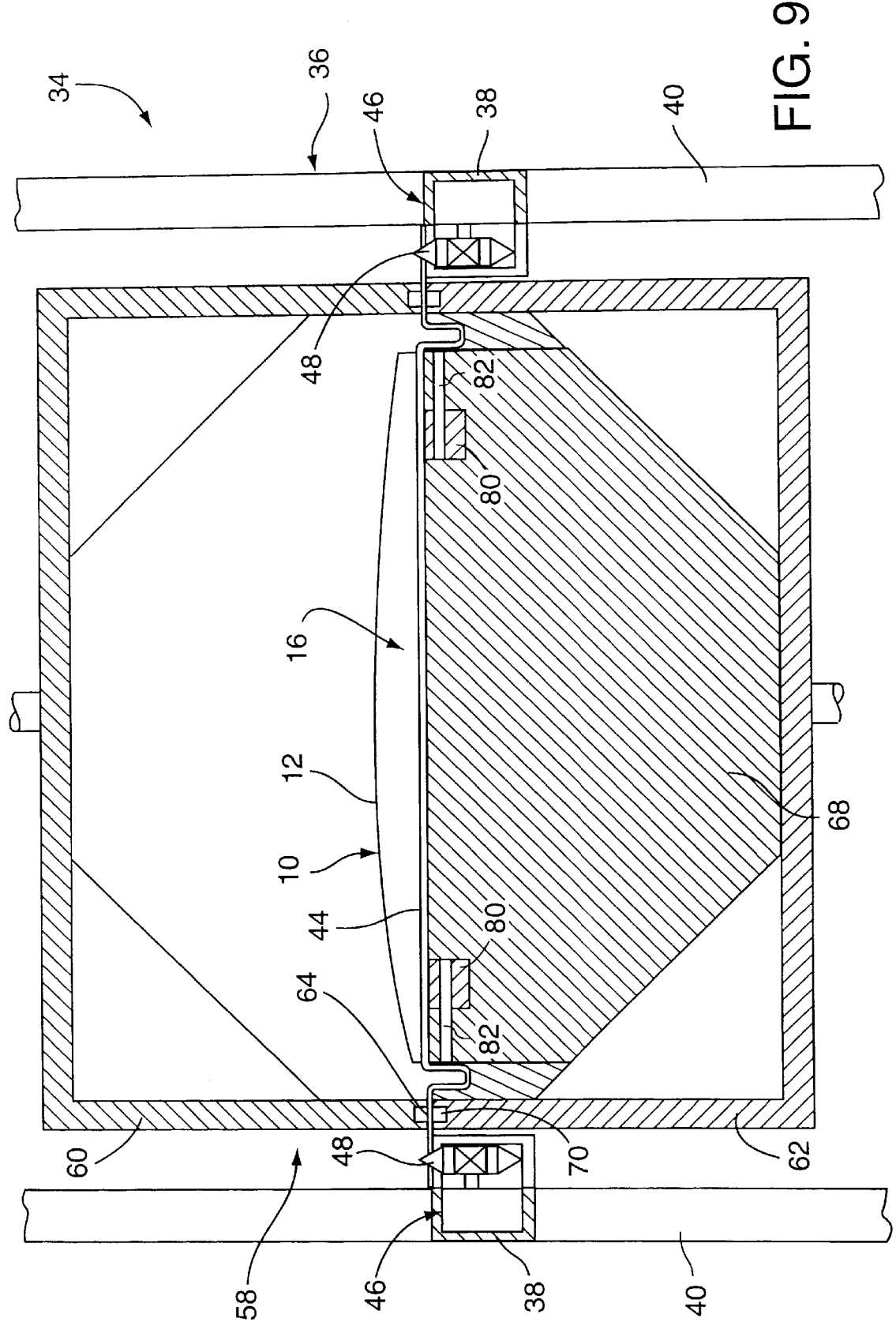
FIG. 9 is a fragmentary sectional view taken along the line 9—9 of FIG. 6.
Figure 10:
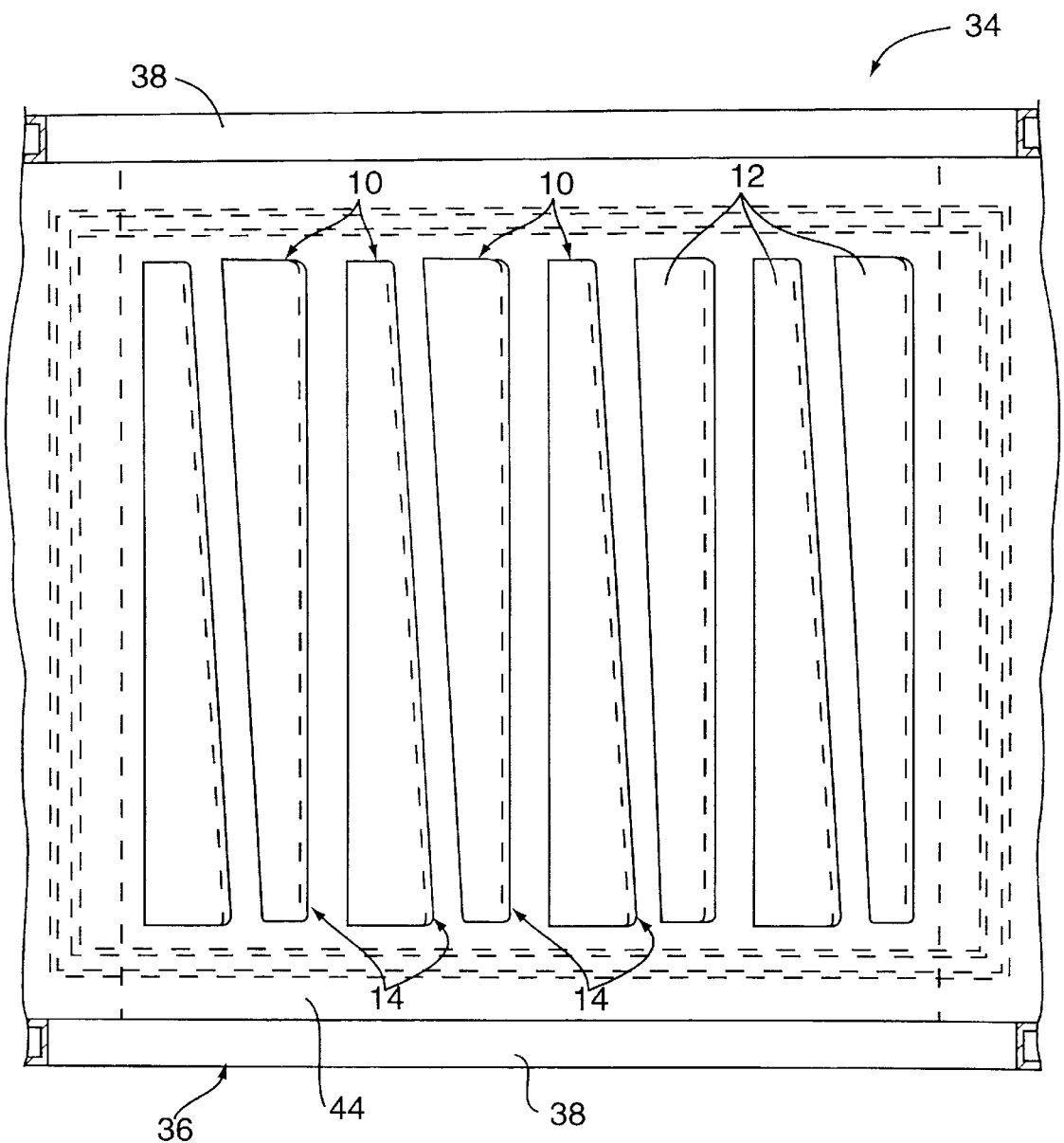
FIG. 10 is a fragmentary sectional view taken along the line 10—10 of FIG. 8.

In accordance with the principles of the present invention, as each successive length of the continuous roll 44 is moved into the molding station, the sheet will assume a supported position on the main frame members 38 extending horizontally within the molding station. The mold assembly 58 is in its open position with the upper mold part 60 raised and the lower mold part 62 lowered, as shown in FIG. 5. As soon as the length of thermoplastic material 44 has been moved into the aforesaid horizontal position, the two mold parts 60 and 62 are moved in a direction relatively toward one another until the peripheral seals 64 and 70 respectively thereof engage the upper and lower surfaces of the sheet 44 so as to provide a peripheral seal over an area of the sheet which is to be molded. During the upward movement of the lower mold part 62, the lower surface of the sheet will be engaged with the main body forming surfaces 74 of the molding horns 72. This engagement is essentially a movement in a direction generally perpendicular to the surfaces 74 so that the sheet is distributed essentially on the surfaces without significant stretching.

With the seal in place and the sheets engaged at least partially on the surfaces 74, the vacuum source is communicated with the vacuum channels 100, and optional channels 106, in the frame structure 68 which, in turn, communicate with interior channels 102 in each of the molding horns. The application of the vacuum to the openings causes the interior surface of the heated sheet 44 to conform with the surfaces provided by the molded horns 72. Due to the locations of the vacuum channel exits, the heated sheet 44 is not drawn to the main body forming surface 74 but is drawn around the entire horn 72 so as to conform to the surface 74. Thus, vacuum dimples are avoided in the main body portion of the cover. In this way, a plurality of covers 10 having a substantially flawless class A finish are molded within the area defined by the peripheral seal.

After the molding step has been completed, the upper mold part 60 is moved upwardly so that its seal 64 leaves the upper surface of the sheet 44. During this movement, the fan assembly 66 directs ambient air onto the upper surface of the sheet 44 in its molded condition. At the same time, the lower mold part 62 moves downwardly and the support cf the sheet provided by the frame members 38 and moving mechanisms 48 initially cause the molding horns to pivot about the pivot pins 82 thereof. The pivotal movement of the molding horns 72 causes the surface 74 to be moved away from the body portions 12 of the covers 10 which have been formed in an angular direction which has a component allowing the marginal edge surfaces 76 of the molding horns to be moved out of the U-shaped marginal edge portions 14 formed in the covers 10. In this way, the molding horns 72 are disengaged from the covers 10 which are molded into the sheet 44 within the area defined by the peripheral seal. When the mold parts 60 and 62 reach their full open position, the drive mechanisms 48 are activated to move the sheet having the covers 10 molded therein into the next station which constitutes a cooling station. As best shown in FIG. 4, an air conditioning and blower assembly 86 is provided at the cooling station. The assembly 86 is operable to cause chilled air at a temperature of approximately 15° C. to be directed at the upper surface of the molded sheet 44 at a rate of about 1,000 cubic feet per minute. After the cooling has taken place, each successive length of continuous roll 44 is advanced into the next station which constitutes a rough cutting station. The rough cutting station includes a vertically movable shear assembly 88 which cooperates with a stationary shear frame 90 to form a rough cut around each of the covers 10 which have been molded within the sheet 44. After the rough cut has been accomplished, the separated covers 10 are then sorted and given a final trim to the final dimensions peripherally. The final step with respect to the formation of the covers is to apply the tapes 30 to the interior surfaces of the body portion 12 and the flanges 26. The remainder of the sheet 44 which is left after the covers have been separately rough cut therefrom is then moved into a final stage indicated schematically at 92 where the remaining thermoplastic material is cut into small pieces for recycling.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A cover for a vehicle pillar part having an exterior surface configuration defined along an elongated peripheral extent thereof by a thin sheet metal marginal edge and along an opposed elongated peripheral extent thereof by an inturned surface, said cover comprising:

a thin sheet of thermoplastic material of generally uniform thickness including a main body portion defined by an upper edge, a lower edge, a first elongated peripheral extent extending between said upper and lower edges, and a second elongated peripheral extent generally opposed to said first elongated peripheral extent, said first elongated peripheral extent including a first vacuum formed transverse bend in the thin sheet of thermoplastic material having a first integral vacuum formed strip extending transversely therefrom in generally parallel coextensive relation to a margin of said main body portion extending along the first peripheral extent thereof, said first transverse bend and strip defining with said margin a marginal edge of U-shaped cross-sectional configuration, said second elongated peripheral extent including a second vacuum formed transverse bend in the thin sheet of thermoplastic material having a second integral vacuum formed strip extending therefrom to form an inturned flange, said first and second bends extending in the same general transverse direction with respect to said main body portion, said thin sheet of thermoplastic material having an interior surface shaped (1) along the U-shaped marginal edge thereof to snugly receive therein the sheet metal marginal edge of the vehicle pillar part (2) along the main body portion thereof to be presented to the exterior surface configuration of the vehicle pillar part, and (3) along the inturned flange thereof to be presented to the inturned surface of the vehicle pillar part, wherein said main body portion has applied to the interior surface thereof one surface of an adhesive layer of a composite tape including a non-adhesive release layer adhered to an opposite surface of said adhesive layer.

2. A cover as defined in claim 1 wherein said thin sheet of thermoplastic material comprises a coated substrate layer of polycarbonate or ABS, PVC or blends thereof, the coating including dried paint materials providing a desired exterior surface color and gloss.

3. A cover as defined in claim 1 wherein said inturned flange has applied to the interior surface thereof one surface of an adhesive layer of a composite tape including a non-adhesive release layer adhered to an opposite surface of said adhesive layer.

4. A cover as defined in claim 1 wherein said cover is for a vehicle B-pillar part.

5. A cover as defined in claim 1 wherein an exterior surface of said main body portion is a substantially dimple-free class A surface.

* * * * *